(12) United States Patent
Ichikawa

(10) Patent No.: US 9,143,247 B2
(45) Date of Patent: Sep. 22, 2015

(54) WIRELESS COMMUNICATION METHOD AND APPARATUS

(75) Inventor: Takeshi Ichikawa, Kanagawa (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 120 days.

(21) Appl. No.: 13/479,317

(22) Filed: May 24, 2012

(65) Prior Publication Data

US 2012/0315857 A1 Dec. 13, 2012

(30) Foreign Application Priority Data

Jun. 7, 2011 (JP) ................................. 2011-127236

(51) Int. Cl.
*H04B 17/00* (2015.01)
*H04B 17/26* (2015.01)
*H04B 17/23* (2015.01)
*H04W 24/10* (2009.01)

(52) U.S. Cl.
CPC .............. *H04B 17/26* (2015.01); *H04B 17/23* (2015.01); *H04W 24/10* (2013.01)

(58) Field of Classification Search
CPC .. H04B 17/0065; H04B 17/007; H04W 24/10
USPC ............ 455/67.11, 63.1, 522, 452.1, 513, 78; 375/259, 347; 370/241
See application file for complete search history.

(56) References Cited

U.S. PATENT DOCUMENTS

| | | | | |
|---|---|---|---|---|
| 6,047,175 A * | 4/2000 | Trompower | ............... | 455/452.1 |
| 6,064,890 A * | 5/2000 | Hirose et al. | ................... | 455/513 |
| 6,256,477 B1 * | 7/2001 | Eidson et al. | ................ | 455/63.3 |
| 6,968,201 B1 * | 11/2005 | Gandhi et al. | ................ | 455/522 |
| 2005/0213674 A1 * | 9/2005 | Kobayashi | ..................... | 375/259 |
| 2008/0069275 A1 * | 3/2008 | Horiguchi et al. | ............. | 375/347 |
| 2008/0153420 A1 * | 6/2008 | Kitchin | ........................ | 455/63.1 |
| 2009/0252042 A1 * | 10/2009 | Bradley et al. | ................ | 370/241 |
| 2011/0039504 A1 * | 2/2011 | Nguyen et al. | .................. | 455/78 |

FOREIGN PATENT DOCUMENTS

| | | | |
|---|---|---|---|
| JP | 62-107542 | A | 5/1987 |
| JP | 2000-156666 | A | 6/2000 |
| JP | 2001-237849 | A | 8/2001 |
| JP | 2007-184831 | A | 7/2007 |
| JP | 2010-263511 | A | 11/2010 |

OTHER PUBLICATIONS

Japanese Office Action dated Jan. 20, 2015.

* cited by examiner

*Primary Examiner* — Wesley Kim
*Assistant Examiner* — Raj Chakraborty
(74) *Attorney, Agent, or Firm* — Rabin & Berdo, P.C.

(57) ABSTRACT

A wireless communication method and apparatus that produce only a small amount of transmission delay even when carrier sensing is performed. Intensity indication data indicating the radio wave intensity of a received wireless signal is generated. The intensity indication data is intermittently captured and retained. An average of the retained intensity indication data is calculated. If the average is less than or equal to a threshold, a wireless transmission operation is enabled. The average is calculated with a frequency according to the frequency of capturing of the intensity indication data. The average and the threshold are compared at a frequency corresponding to the frequency of calculation of the average.

16 Claims, 9 Drawing Sheets

WIRELESS COMMUNICATION METHOD AND APPARATUS

BACKGROUND OF THE INVENTION

1. Field of the Invention

The present invention relates to a wireless communication method and apparatus for performing communication by using a wireless signal.

2. Description of the Related Art

A wireless communication system including a base station and a plurality of wireless communication terminals each transmitting data retained in the own terminal (hereinafter, referred to as retained data) to the base station has been known heretofore. Examples of communication schemes employed in such a system include carrier sense multiple access/collision avoidance (CSMA/CA). According to the CSMA/CA communication scheme, when a wireless communication apparatus transmits its own retained data, the wireless communication apparatus performs so-called carrier sensing (CCA: Clear Channel Assessment) to make sure that no other wireless communication apparatus is transmitting retained data (for example, Patent Literature 1). The purpose of the CCA operation is to prevent the transmission of the own retained data from being interfered with and hindered by transmission waves of retained data from other wireless communication apparatuses. Specifically, a wireless communication terminal measures a wireless signal intensity around the own terminal for a predetermined period, and transmits retained data if an average intensity in the period is less than or equal to a predetermined value.

CITATION LIST

Patent Literature

PTL 1: Japanese Patent Kokai No. 2010-263511

SUMMARY OF THE INVENTION

According to the IEEE 802.15.4 communication standard, carrier sensing is defined to be performed before transmission of retained data as described above. According to the definition, a wireless signal intensity needs to be measured for a predetermined period before transmission of retained data. If the average intensity is determined to be greater than or equal to a predetermined value, the wireless signal intensity needs to be measured further for a predetermined period after the determination, before the same determination is made.

Suppose, for example, that the average intensity in one predetermined period is determined to be greater than or equal to the predetermined value, but the wireless signal intensity drops to or below the predetermined value and it becomes virtually possible to transmit retained data immediately after the determination. Even in such a case, the wireless signal intensity is measured further for a predetermined time after the determination. There has thus been a problem of an inevitable transmission delay as much as the predetermined period.

The present invention has been achieved in view of the foregoing problem. An object of the present invention is to provide a wireless communication method and apparatus which produce only a small amount of transmission delay even when carrier sensing is performed.

A wireless communication method according to the present invention is a wireless communication method for performing wireless communication by using a wireless signal, the wireless communication method including: an intensity indication data generation step of generating intensity indication data indicating a radio wave intensity of a received wireless signal; a data retaining step of intermittently capturing and retaining the intensity indication data; an average calculation step of calculating an average of the intensity indication data retained in the data retaining step; a comparison step of comparing the average with a threshold; and a control step of enabling a wireless transmission operation when the average is less than or equal to the threshold, the average calculation step including calculating the average with a frequency corresponding to a frequency of capturing of the intensity indication data in the data retaining step, the comparison step including comparing the average with the threshold at a frequency corresponding to a frequency of calculation of the average.

A wireless communication apparatus according to the present invention is a wireless communication apparatus for performing wireless communication by using a wireless signal, the wireless communication apparatus including: an intensity indication data generation part for generating intensity indication data indicating a radio wave intensity of a received wireless signal; a data retaining part for intermittently capturing and retaining the intensity indication data; an average calculation part for calculating an average of the intensity indication data retained in the data retaining part; a comparison part for comparing the average with a threshold; and a control part for enabling a wireless transmission operation when the average is less than or equal to the threshold, the average calculation part calculating the average with a frequency corresponding to a frequency of capturing of the intensity indication data in the data retaining step, the comparison part comparing the average with the threshold at a frequency corresponding to a frequency of calculation of the average.

According to the wireless communication method and apparatus of the present invention, the amount of transmission delay can be reduced even when carrier sensing is performed.

DETAILED DESCRIPTION OF THE INVENTION

Hereinafter, embodiments of the present invention will be described in detail with reference to the accompanying drawings.

<First Embodiment>

Figure 1:
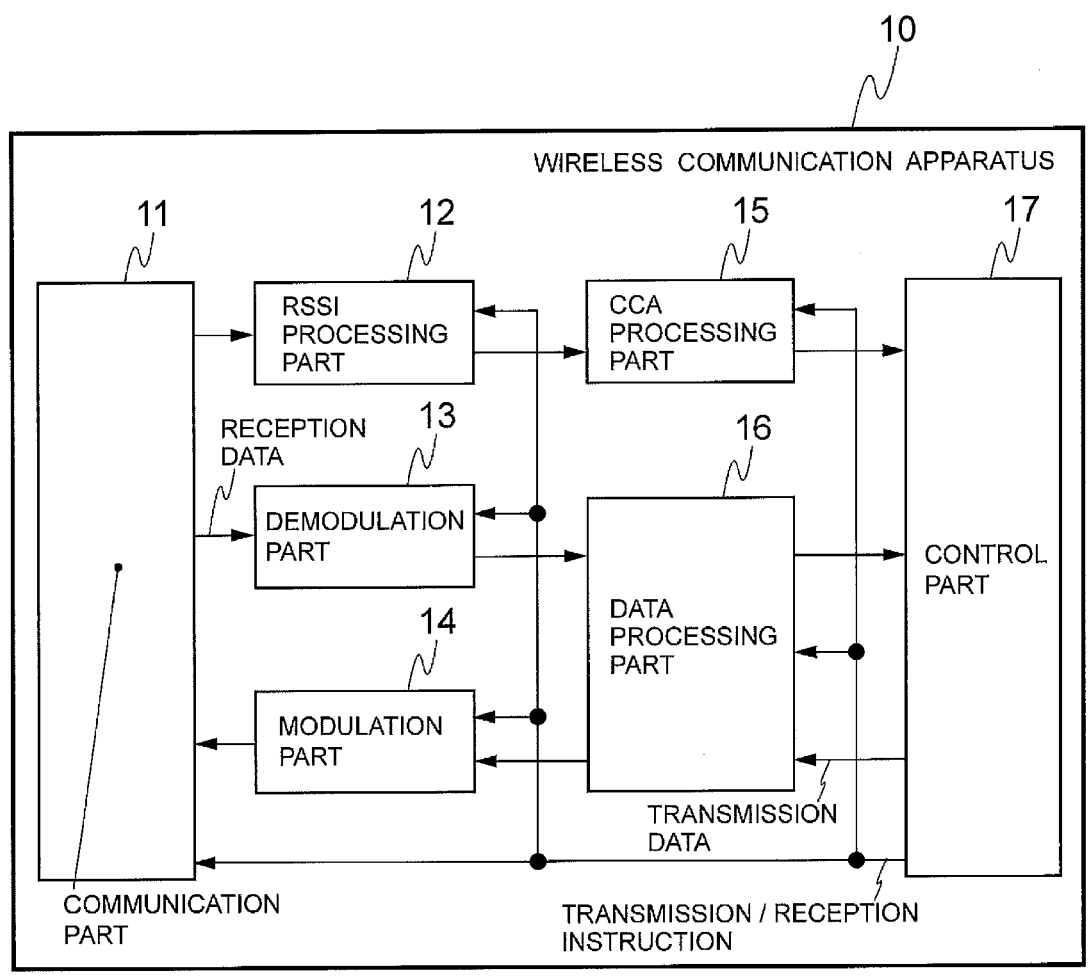
FIG. 1 is a block diagram showing the configuration of a wireless communication apparatus which is an embodiment of the present invention.

FIG. 1 shows the configuration of a wireless communication apparatus 10 which is an embodiment of the present invention. An example of the wireless communication apparatus 10 may be a terminal that includes a temperature measurement sensor (not shown). The wireless communication apparatus 10 may transmit various types of data including temperature data acquired by the sensor to a base station (not shown).

A communication part 11 wirelessly transmits modulation data supplied from a modulation part 14 according to a transmission instruction from a control part 17. The communication part 11 receives a wireless signal according to a reception instruction from the control part 17, and supplies the received wireless signal to a demodulation part 13.

A receive signal strength indication (RSSI) processing part 12 measures the signal intensity of the wireless signal received by the communication part 11, and generates a measurement result as an RSSI value. The RSSI processing part 12 intermittently performs the measurement and generation, calculates an average of a plurality of resulting RSSI values (hereinafter, referred to as an average RSSI value), and supplies the average RSSI value to a CCA processing part 15 in the subsequent stage.

The demodulation part 13 applies processing such as an RF-to-IF conversion to the wireless signal received by the communication part 11 for demodulation, and supplies the resulting demodulation data to a data processing part 16.

The modulation part 14 applies modulation processing to transmission data supplied from the data processing part 16, and supplies the resulting modulation data to the communication part 11.

The CCA processing part 15 determines whether modulation data can be transmitted or not, based on a comparison between the average RSSI value supplied from the RSSI processing part 12 and a predetermined threshold. The CCA processing part 15 notifies the determination result to the control part 17.

The data processing part 16 applies various types of data processing to transmission data supplied from the control part 17 and demodulation data supplied from the demodulation part 13. The data processing part 16 applies transmission data composition processing to the supplied transmission data, and supplies the processed data to the modulation part 14. Examples of the transmission data composition processing include the addition of preambles and unique words and the addition of CRC calculation values. The data processing part 16 applies packet data processing to the supplied demodulation data, and notifies the result to the control part 17. Examples of the packet data processing include unique word detection, data length detection, and CRC determination.

The control part 17 controls the operation of the entire wireless communication apparatus 10. The control part 17 can issue transmission/reception instructions to the functional blocks 11 to 16 mentioned above. Hereinafter, the CCA processing part 15 and the control part 17 may be referred to collectively as a comparison part.

Figure 2:
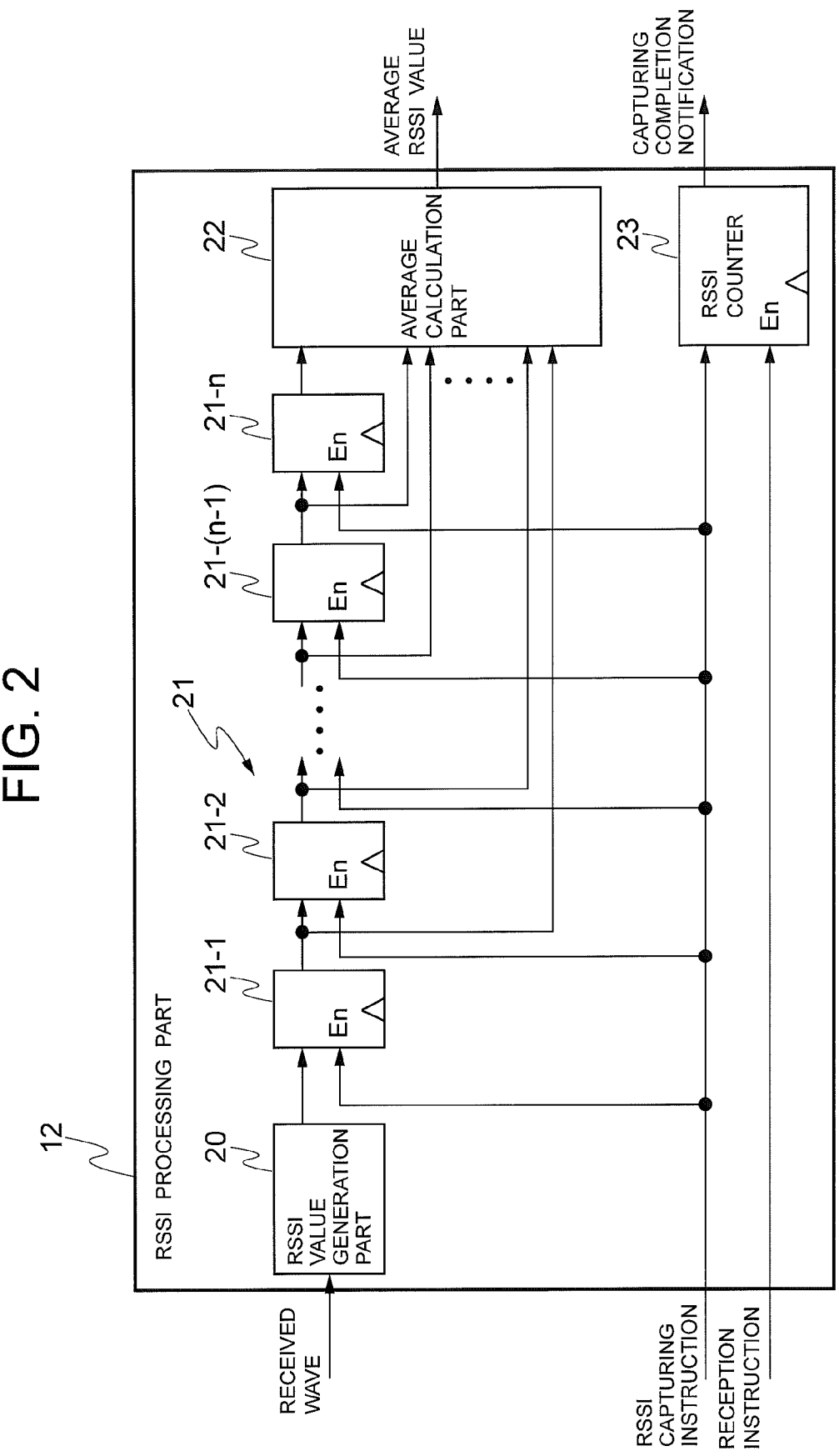
FIG. 2 is a block diagram showing the configuration of an RSSI processing part of FIG. 1.

FIG. 2 shows the configuration of the RSSI processing part 12.

An RSSI value generation part 20 generates an RSSI value which indicates the signal intensity of the wireless signal currently received by the communication part 11. Hereinafter, an RSSI value will also be referred to as intensity indication data, and the RSSI value generation part 20 as an intensity indication data generation part.

A shift register 21 captures RSSI values generated by the RSSI value generation part 20 in succession, and retains the RSSI values in registers 21-1 to 21-$n$ ($n$ is an integer greater than or equal to two) in time series order. Hereinafter, the shift register 21 will also be referred to as a data retaining part. The shift register 21 captures an RSSI value each time an RSSI capturing instruction is supplied from the control part 17 (FIG. 1). For example, when the transmission and reception rate of wireless data is 100 Kbps, an RSSI capturing instruction is supplied at every ten microseconds. The following description deals with a case where $n$ is eight, i.e., there are registers 21-1 to 21-8. In such a case, the shift register 21 can simultaneously retain up to eight RSSI values.

An average calculation part 22 calculates an average of RSSI values supplied from the respective registers 21-1 to 21-8, and supplies the average RSSI value to the CCA processing part 15 (FIG. 1).

An RSSI counter 23 counts the number of RSSI capturing instructions supplied from the control part 17 when a reception instruction is supplied from the control part 17. If the count reaches a predetermined value, the RSSI counter 23 supplies a capturing completion notification to the CCA processing part 15 (FIG. 1). If the shift register 21 includes eight registers 21-1 to 21-8, the predetermined value is "8."

Figure 3:
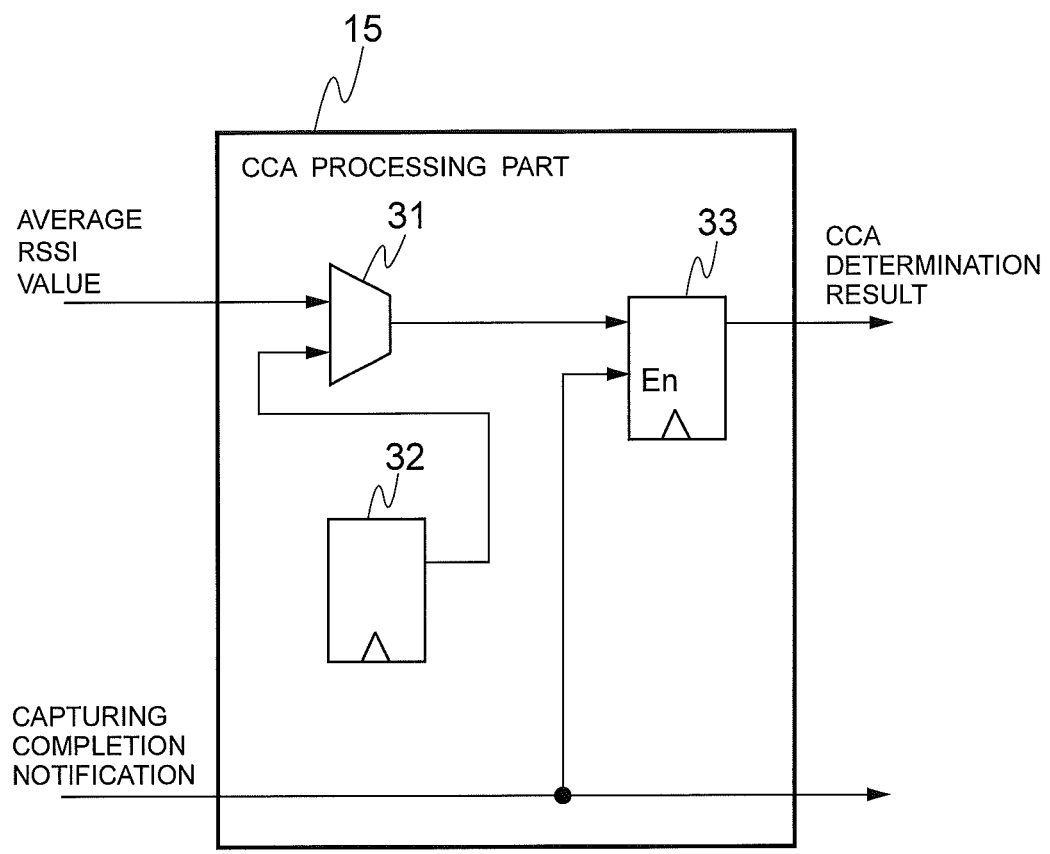
FIG. 3 is a block diagram showing the configuration of a CCA processing part of FIG. 1.

FIG. 3 shows the configuration of the CCA processing part 15.

A comparison part 31 compares the average RSSI value supplied from the RSSI processing part 12 (FIG. 1) with a predetermined threshold retained in a threshold storage register 32, and outputs the result of comparison.

The threshold storage register 32 retains the predetermined threshold. The threshold is used for radio wave intensity comparison using so-called carrier sensing (CCA). The threshold is set to a value of appropriate level at which interference with wireless transmission is unlikely to occur when the communication part 11 wirelessly transmits modulation data supplied from the modulation part 14.

A CCA determination register 33 outputs the result of comparison of the comparison part 31 as a CCA comparison result when a capturing completion notification from the RSSI processing part 12 (FIG. 1) is received. The CCA determination result is supplied to the control part 17 (FIG. 1).

Figure 4:
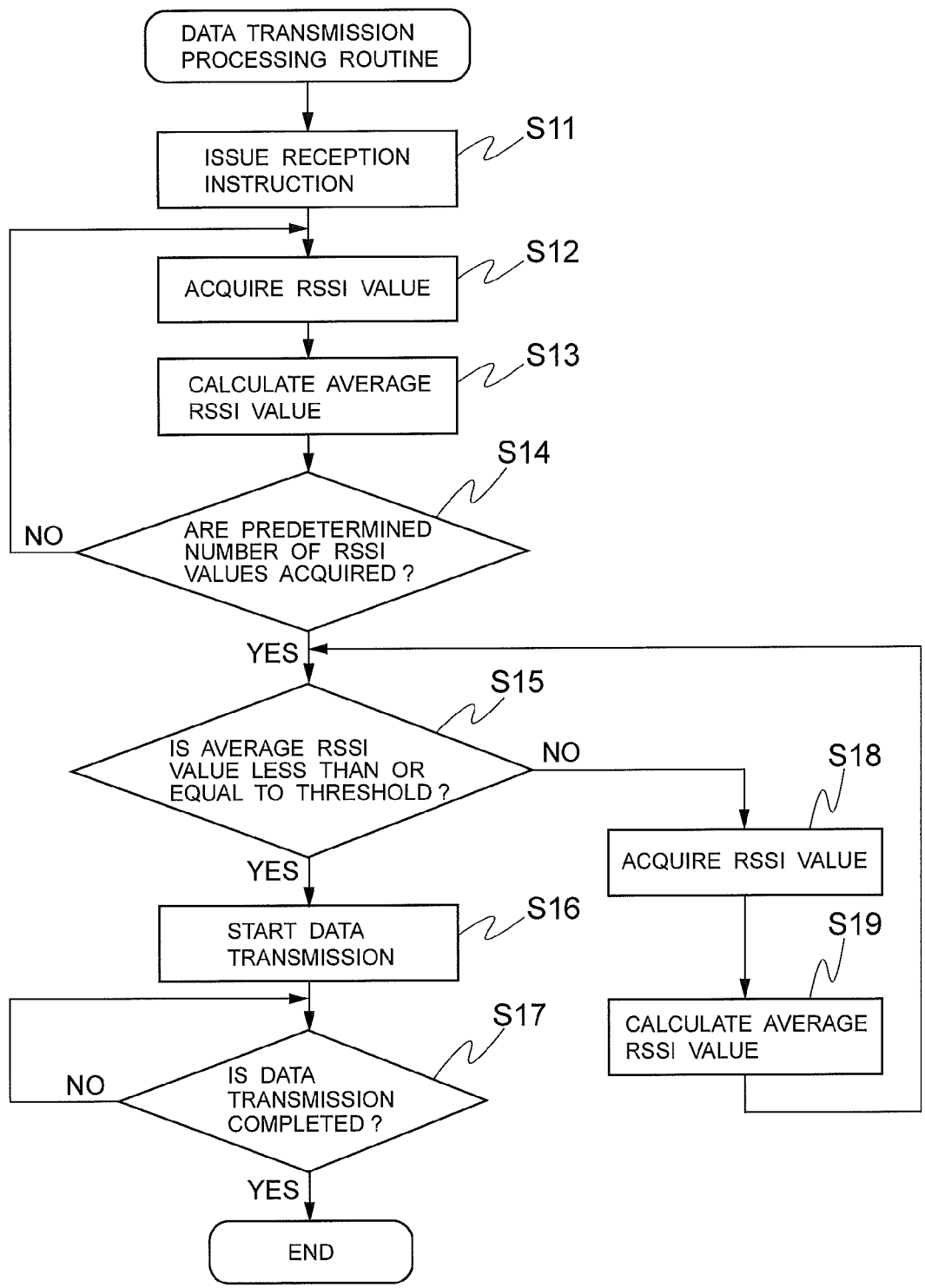
FIG. 4 is a flowchart showing a data transmission processing routine of the wireless communication apparatus.

Referring to FIG. 4, the operation of data transmission processing by the wireless communication apparatus 10 will be described.

Initially, the control part 17 issues a reception instruction to the communication part 11, the RSSI processing part 12, the demodulation part 13, and the data processing part 16 (step S11).

In response to the reception instruction, the RSSI value generation part 20 of the RSSI processing part 12 generates an RSSI value that indicates the signal intensity of the wireless signal currently received by the communication part 11. The shift register 21 of the RSSI processing part 12 captures the RSSI value generated by the RSSI value generation part 20 each time an RSSI capturing instruction is supplied from the control part 17 (step S12). The registers 21-1 to 21-$n$ of the shift register 21 retain RSSI values in time series order. The registers 21-1 to 21-$n$ supply their respective retained RSSI values to the average calculation part 22.

The average calculation part 22 calculates an average of the RSSI values supplied from the respective registers 21-1 to 21-$n$ (step S13).

The RSSI counter 23 counts the number of RSSI capturing instructions issued from the control part 17. If the count reaches the predetermined value, the RSSI counter 23 determines that a predetermined number of RSSI values have been captured, and supplies a capturing completion notification to the CCA processing part (step S14).

The comparison part 31 of the CCA processing part 15 determines by comparison whether or not the average RSSI value calculated by the RSSI processing part 12 is less than or equal to the predetermined threshold retained in the threshold storage register 32 (step S15). Hereinafter, such a comparison and determination will be referred to as a CCA determination. Receiving a capturing completion notification, the CCA determination register 33 starts captures the result of comparison and determination made by the comparison part 31 and outputs the result as a CCA determination result. The CCA determination result is supplied to the control part 17. Hereinafter, the result of comparison and determination that the average RSSI value is less than or equal to the threshold will be referred to as a transmission enable determination. The result of comparison and determination that the average RSSI value is greater than the threshold will be referred to as a transmission disable determination.

If the CCA determination result is a transmission enable determination, the control part 17 gives the transmission part 11 a notification that enables wireless transmission of modulation data to a base station (not shown) (step S16).

The communication part 11 transmits modulation data until it receives a notification of data transmission completion from the control part 17. Receiving the notification, the communication part 11 ends the data transmission processing (step S17). Such an operation allows the wireless communication apparatus 10 to wirelessly transmit modulation data when no wireless communication apparatus (not shown) other than the wireless communication apparatus 10 is transmitting data to the base station (not shown), i.e., when ambient radio transmission waves are not so high as to serve as interfering waves.

In step S15, if the CCA determination result is a transmission disable determination, the control part 17 issues an RSSI capturing instruction to the shift register 21 without giving the communication part 11 an instruction to start transmission of modulation data. In response to the RSSI capturing instruction, the shift register 21 captures one RSSI value from the RSSI value generation part 20 (step S18). The one RSSI value is retained in the register 21-1. The RSSI value that has been retained in the register 21-8 in the final stage before the capturing is discarded.

After the capturing of the one RSSI value into the shift register 21, the average calculation part 22 calculates an average of the RSSI values supplied from the respective registers 21-1 to 21-n again (step S19). The same processing as described above is repeated (steps S15, S18, and S19) until the average RSSI value falls to or below the predetermined threshold.

As described above, the wireless communication apparatus 10 according to the present embodiment intermittently captures RSSI values, retains the RSSI values in the shift register 21 in a time-series manner, and calculates an average of the retained RSSI values. After a predetermined number of RSSI values are captured into the shift register 21, the wireless communication apparatus 10 determines whether or not an average RSSI value is less than or equal to a predetermined threshold. If the average RSSI value is less than or equal to the predetermined threshold, the wireless communication apparatus 10 starts wireless transmission of modulation data. On the other hand, if the average RSSI value is greater than the predetermined threshold, the wireless communication apparatus 10 captures an RSSI value into the shift register 21 and recalculates an average RSSI value. Again, the wireless communication apparatus 10 determines whether or not the average RSSI value is less than or equal to the predetermined threshold. If the average RSSI value is less than or equal to the predetermined threshold, the wireless communication apparatus 10 starts wireless transmission of modulation data.

Figure 5:
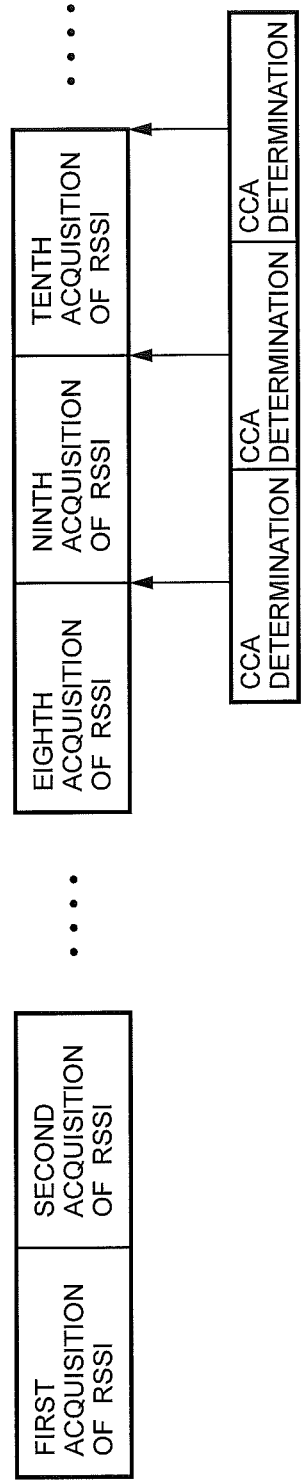
FIG. 5 is an explanatory diagram showing CCA determination timing.

FIG. 5 shows CCA determination timing of the CCA processing part 15. The CCA processing part 15 starts to output a CCA determination result when a predetermined number (in FIG. 5, eight) of RSSI values have been captured into the shift register 21 and the CCA processing part 15 receives a capturing completion notification. If the CCA determination result is a transmission disable determination, the shift register 21 captures an RSSI value further. The average calculation part 22 calculates an average RSSI value upon each capturing. The CCA processing part 15 outputs a CCA determination result each time an average RSSI value is calculated. That is, the CCA processing part 15 outputs a CCA determination result at each capturing time such as when the ninth RSSI value is captured and when the tenth RSSI value is captured. When the CCA determination result becomes a transmission enable determination, wireless transmission of modulation data is immediately started.

As described above, even if an average RSSI value is once determined to be greater than a predetermined threshold, a predetermined number or more of captured RSSI values are retained to make an immediate determination when a subsequent RSSI value is captured. Consequently, if RSSI values drop immediately after and an average RSSI value falls to or below the predetermined threshold, wireless transmission of modulation data can be started at once. According to the wireless communication apparatus 10 of the present embodiment, the amount of transmission delay can thus be reduced even when carrier sensing is performed.

Since a predetermined number of RSSI values are captured into the shift register 21 before the calculation of an average RSSI value, carrier sense processing conforming to communication standards such as IEEE 802.15.4 can be implemented.

Retaining RSSI values in the shift register enables the calculation of the latest average RSSI value, which can improve the accuracy of CCA determination.

<Second Embodiment>

Hereinafter, a description will be given mainly of differences from the first embodiment.

Figure 6:
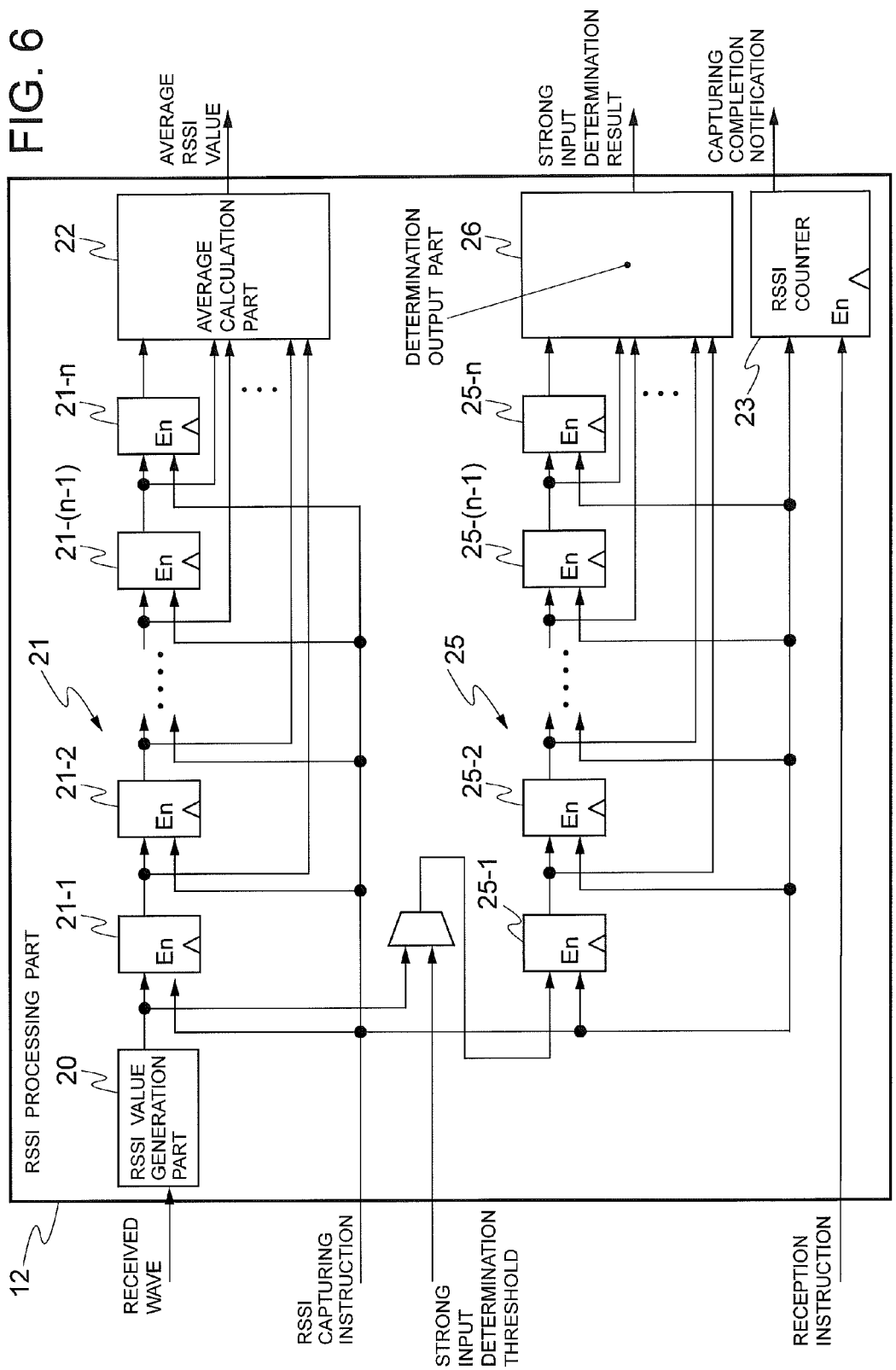
FIG. 6 is a block diagram showing the configuration of an RSSI processing part according to a second embodiment.

FIG. 6 shows the configuration of the RSSI processing part 12 according to the present embodiment.

A determination circuit 24 compares an RSSI value supplied from the RSSI value generation part 20 with a strong input determination threshold supplied from the control part 17, and supplies determination result data indicating the result of comparison to a shift register 25. The strong input determination threshold is set to a value of appropriate level at which interference with wireless transmission is likely to occur when the communication part 11 wirelessly transmits modulation data from the modulation part 14. For example, when an RSSI value is less than or equal to the strong input determination threshold, the logical value of the determination result data is "0." When an RSSI value is greater than the strong input determination threshold, the logical value is "1."

A shift register 25 captures pieces of determination result data supplied from the determination circuit 24 in succession, and retains the pieces of determination result data in registers 25-1 to 25-n in time series order. The shift register 25 captures determination result data each time an RSSI capturing instruction is supplied from the control part 17 (FIG. 1). The number of registers 25-1 to 25-n is the same as that of registers 21-1 to 21-n. The following description deals with a case where there are registers 25-1 to 25-8. In such a case, the shift register 25 can simultaneously retain up to eight pieces of determination result data.

Figure 7:
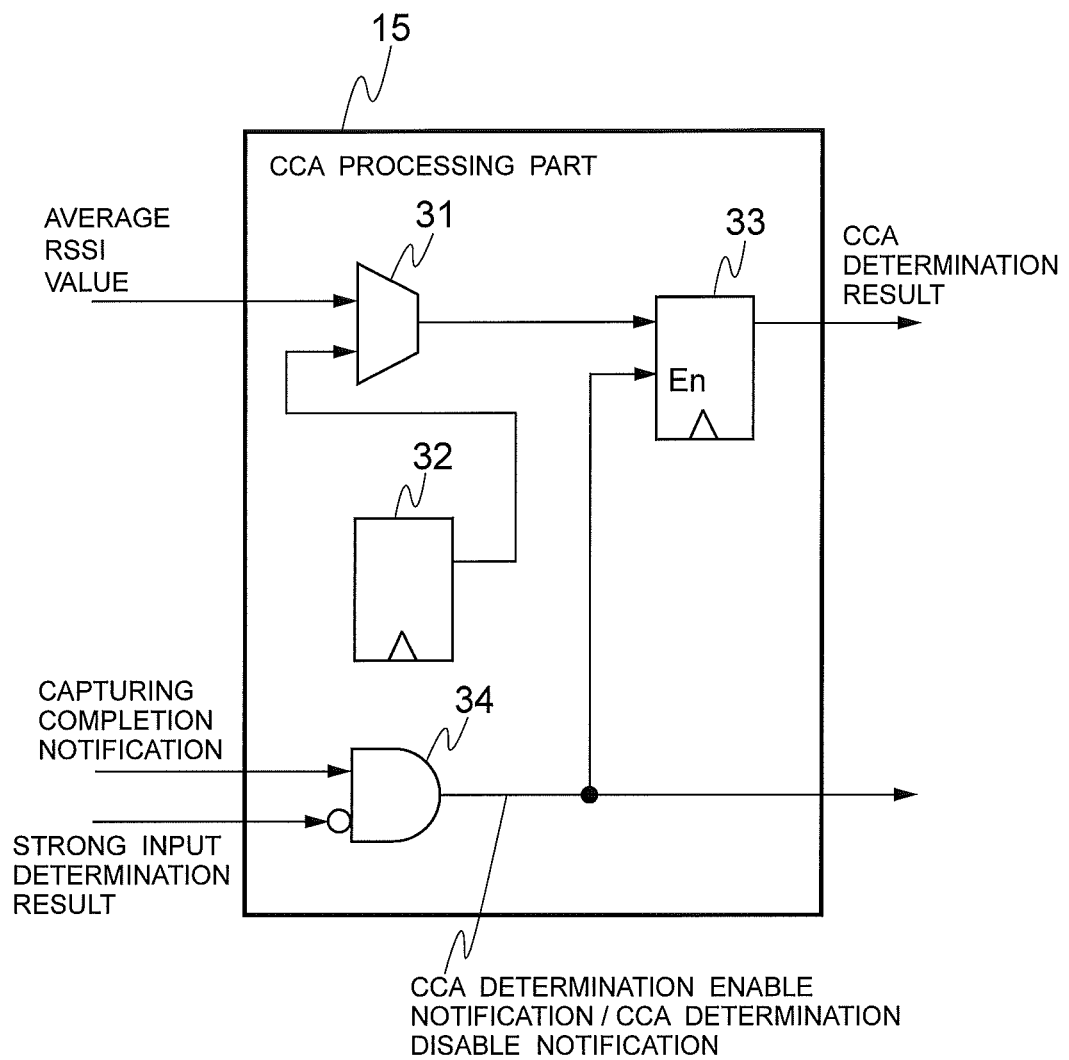
FIG. 7 is a block diagram showing the configuration of a CCA processing part according to the second embodiment.

If all the pieces of determination result data retained in the registers 25-1 to 25-8 have a logical value of "0," a determination output part 26 outputs a strong input determination result that indicates that all the RSSI values retained in the registers 21-1 to 21-$n$ are less than or equal to the strong input determination threshold (hereinafter, referred to as a strong input non-detection determination). The strong input non-detection determination is supplied to the CCA processing part 15 (FIG. 7). For example, the strong input non-detection determination is represented by a logical value of "0."

If at least one of the pieces of determination result data retained in the registers 25-1 to 25-8 has a logical value of "1," the determination output part 26 outputs a strong input determination result that indicates that at least one of the RSSI values retained in the registers 21-1 to 21-$n$ is greater than the strong input determination threshold (hereinafter, referred to as a strong input detection determination). The strong input detection determination is supplied to the CCA processing part 15 (FIG. 7). For example, the strong input detection determination is represented by a logical value of "1."

Hereinafter, the determination circuit 24, the shift register 25, and the determination output part 26 will be referred to collectively as a strong input determination part.

FIG. 7 shows the configuration of the CCA processing part 15 according to the present embodiment.

A determination enable notification issuance part 34 outputs a CCA determination enable notification if a capturing completion notification and a strong input determination result indicating a strong input non-detection determination are supplied from the RSSI processing part 12 (FIG. 6). On the other hand, if no capturing completion notification is supplied or a strong input determination result indicating a strong input detection determination is supplied, the determination enable notification issuance part 34 outputs a CCA determination disable notification.

For example, the determination enable notification issuance part 34 may include an AND circuit. In such a case, the determination enable notification issuance part 34 can output a CCA determination enable notification or CCA determination disable notification with a capturing completion notification as one input and a strong input determination result as the other input. For example, suppose that a capturing completion notification having a logical value "1" is input to the one input and the inverted logical value "1" of a strong input determination result having a logical value "0," which represents a strong input non-detection determination, is input to the other input. In such a case, the determination enable notification issuance part 34 outputs a CCA determination enable notification having a logical value "1."

Receiving a CCA determination enable notification from the determination enable notification issuance part 34, the CCA determination register 33 captures the result of comparison made by the comparison part 31 and outputs the result as a CCA determination result. The CCA determination result is supplied to the control part 17 (FIG. 1).

Figure 8:
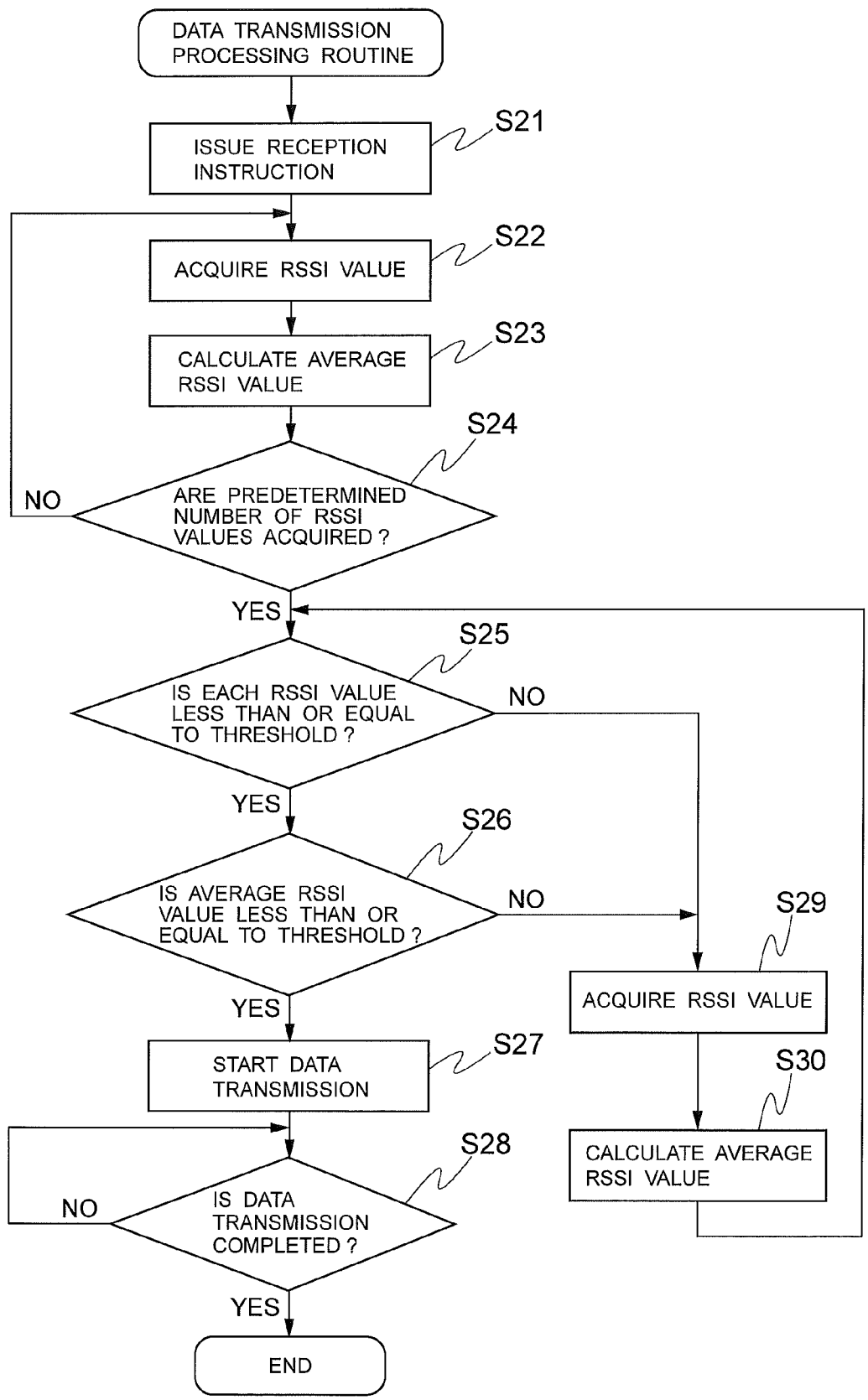
FIG. 8 is a flowchart showing a data transmission processing routine according to the second embodiment.

Referring to FIG. 8, the operation of data transmission processing by the wireless communication apparatus 10 will be described.

Initially, the control part 17 issues a reception instruction to the communication part 11, the RSSI processing part 12, the demodulation part 13, and the data processing part 16 (step S21).

In response to the reception instruction, the RSSI value generation part 20 of the RSSI processing part 12 generates an RSSI value that indicates the signal intensity of the wireless signal currently received by the communication part 11. The shift register 21 of the RSSI processing part 12 captures the RSSI value generated by the RSSI value generation part 20 each time an RSSI capturing instruction is supplied from the control part 17 (step S22). The registers 21-1 to 21-$n$ of the shift register 21 retain RSSI values in time series order. The registers 21-1 to 21-$n$ supply their respective retained RSSI values to the average calculation part 22.

The average calculation part 22 calculates an average of the RSSI values supplied from the respective registers 21-1 to 21-$n$ (step S23).

The RSSI counter 23 counts the number of RSSI capturing instructions issued from the control part 17. If the count reaches the predetermined value, the RSSI counter 23 determines that a predetermined number of RSSI values have been acquired, and supplies a capturing completion notification to the CCA processing part (step S24).

Next, the determination output part 26 determines whether or not all the RSSI values retained in the registers 21-1 to 21-$n$ are less than or equal to a strong input determination threshold (step S25). If all the pieces of determination result data retained in the registers 25-1 to 25-8 have a logical value of "0," the determination output part 26 determines that all the RSSI values are less than or equal to the strong input determination threshold. In such a case, the determination output part 26 gives the CCA processing part 15 a strong input determination result that represents a strong input non-detection determination.

Next, the comparison part 31 of the CCA processing part 15 determines by comparison whether or not the average RSSI value calculated by the RSSI processing part 12 is less than or equal to the predetermined threshold retained in the threshold storage register 32 (step S26). The CCA determination register 33 captures the result of comparison and determination made by the comparison part 31 according to a capturing completion notification and a strong input determination result indicating a strong input non-detection determination. The CCA determination register 33 outputs the result as a CCA determination result. The CCA determination result is supplied to the control part 17.

If the CCA determination result is a transmission enable determination, the control part 17 gives the transmission part 11 a notification that enables wireless transmission of modulation data to a base station (not shown) (step S27).

The communication part 11 transmits modulation data until it receives a notification of data transmission completion from the control part 17. Receiving the notification, the communication part 11 ends the data transmission processing (step S28).

If the determination output part 26 determines in step S25 that at least one of the RSSI values retained in the registers 21-1 to 21-$n$ is greater than the strong input determination threshold, the determination output part 26 gives the CCA processing part 15 and the control part 17 a strong input determination result that represents a strong input detection determination. It should be appreciated that the determination output part 26 makes the strong input detection determination when at least one of the pieces of determination result data retained in the registers 25-1 to 25-8 is determined to have a logical value of "1."

In such a case, the control part 17 issues an RSSI capturing instruction to the shift register 21 without giving the communication part 11 an instruction to start transmission of modulation data. In response to the RSSI capturing instruction, the shift register 21 captures one RSSI value from the RSSI value generation part 20 (step S29).

After the capturing of the one RSSI value into the shift register 21, the average calculation part 22 calculates an average of the RSSI values supplied from the respective registers 21-1 to 21-n again (step S30). The same processing as described above is repeated (steps S25, S29, and S30) until a strong input non-detection determination is made.

In step S26, if the CCA determination result is a transmission disable determination, the control part 17 issues an RSSI capturing instruction to the shift register 21 without giving the communication part 11 an instruction to start transmission of modulation data. In response to the RSSI capturing instruction, the shift register 21 captures one RSSI value from the RSSI value generation part 20 (step S29).

After the capturing of the one RSSI value into the shift register 21, the average calculation part 22 calculates an average of the RSSI values supplied from the respective registers 21-1 to 21-n again (step S30). The same processing as described above is repeated (steps S26, S29, and S30) until the average RSSI value falls to or below the predetermined threshold.

As described above, the wireless communication apparatus 10 according to the present embodiment includes the shift register 25 which has the same number of registers as that of the shift register 21 which retains RSSI values in a time-series manner. The shift register 25 retains the results of comparison between the RSSI values and a strong input determination threshold in a time-series manner. If all the RSSI values retained in the shift register 21 are less than or equal to the strong input determination threshold, the wireless communication apparatus 10 starts wireless transmission of modulation data. On the other hand, if at least one of the RSSI values retained in the shift register 21 is greater than the strong input determination threshold, the wireless communication apparatus 10 captures an RSSI value into the shift register 21 and recalculates an average RSSI value. Again, the wireless communication apparatus 10 determines whether or not the average RSSI value is less than or equal to the predetermined threshold. If the average RSSI value is less than or equal to the predetermined threshold, the wireless communication apparatus 10 starts wireless transmission of modulation data.

Figure 9:
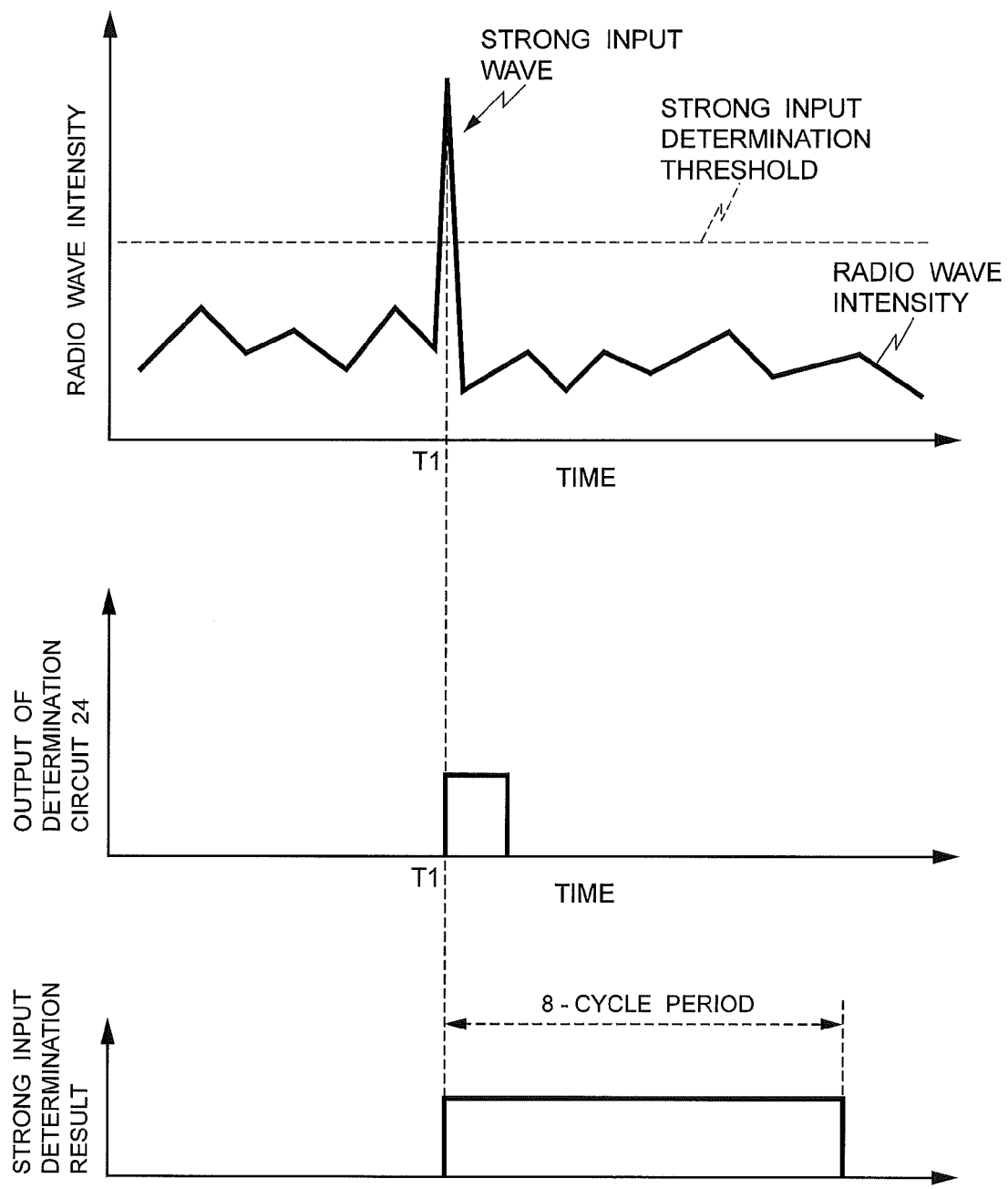
FIG. 9 is a time chart showing changes of a radio wave intensity, the output of a determination circuit, and a strong input determination result.

FIG. 9 shows changes of a radio wave intensity, the output of the determination circuit 24, and the strong input determination result on a time axis. By time T1, the radio wave intensity is lower than or equal to a strong input determination threshold, and the output logical value of the determination circuit 24 is "0." Until time T1, a logical value of "0" continues being supplied from the determination circuit 24 to the shift register 25. The strong input determination result, the output of the determination output part 26, thus has a logical value of "0" which represents a strong input non-detection determination.

At time T1, the radio wave intensity exceeds the strong input determination threshold. Thus, the determination circuit 24 outputs a logical value of "1" which indicates the detection of strong input radio waves at time T1. After time T1, the shift register 25 retains the logical value of "1" for eight cycles. The determination output part 26 thus outputs a strong input determination result having a logical value of "1" which represents a strong input detection determination. Consequently, no modulation data is transmitted during the period of eight cycles after the detection of the strong radio waves.

As described above, when the wireless communication apparatus 10 according to the present embodiment detects an unstable radio wave condition where instantaneous strong radio waves occur, the wireless communication apparatus 10 transmits no modulation data for a certain period since the time of detection even if an average RSSI value is less than or equal to a threshold. Such an operation allows more stable wireless transmission of modulation data while reducing the amount of transmission delay resulting from carrier sensing.

The foregoing embodiments have dealt with the cases where an average is calculated each time RSSI data is captured into the shift register 21, and the average is compared with a threshold upon each average calculation. However, this is not restrictive. An average may be calculated with a frequency according to the frequency of capturing of RSSI data. For example, an average may be calculated each time m pieces (m is an integer greater than or equal to two) of RSSI data are captured. An average and a threshold may be compared at a frequency according to the frequency of calculation of the average. For example, an average and a threshold may be compared at every m calculations of an average.

This application is based on Japanese Patent Application No. 2011-127236 which is herein incorporated by reference.

What is claimed is:

1. A wireless communication method for performing wireless communication by using a wireless signal, the wireless communication method comprising:
   an intensity indication data generation step of successively generating intensity indication data each indicating an instantaneous radio wave intensity value of a received wireless signal;
   a first data capturing and retaining step of causing a plurality of registers to intermittently capture and retain the instantaneous radio wave intensity values indicated by each of the intensity indication data;
   a first average calculation step of calculating an average of the instantaneous radio wave intensity values retained by the plurality of registers;
   a comparison step of comparing said average with a threshold;
   a control step of enabling a wireless transmission operation when the average is less than or equal to the threshold;
   a second data capturing and retaining step of, after said first average calculation step and upon detecting by said comparison step that the average exceeds the threshold, causing one of the plurality of registers to capture and retain another instantaneous radio wave intensity value of the received wireless signal; and
   a second average calculation step of, upon detecting by said comparison step that the average exceeds the threshold, re-calculating the average using the values retained by the plurality of registers after said second data capturing and retaining step, wherein
   the first average calculation step includes calculating the average with a frequency corresponding to a frequency of capturing the intensity indication data by the first data capturing and retaining step, and
   the comparison step includes comparing the average with the threshold at a frequency corresponding to a frequency of calculation of the average.

2. The wireless communication method according to claim 1, wherein said first average calculation step includes calculating the average when a predetermined number of pieces of the intensity indication data have been captured by said first data capturing and retaining step.

3. The wireless communication method according to claim 1, wherein said first data capturing and retaining step includes causing the plurality of registers to capture the intensity indication data in a time-series manner.

4. The wireless communication method according to claim 3, wherein said first data capturing and retaining step includes causing the plurality of registers to discard, if the number of pieces of the intensity indication data retained has reached a predetermined number, one of the retained pieces of the intensity indication data each time a subsequent piece of the intensity indication data is captured.

5. The wireless communication method according to claim 1, further comprising a strong input determination step of determining whether an intensity indicated by at least one of the pieces of intensity indication data retained by the plurality of registers is greater than a strong input threshold, wherein
said comparison step includes performing, if the intensity is determined to be greater than said strong input threshold in the strong input determination step, the wireless transmission after a lapse of a certain period since the time of the determination.

6. A wireless communication apparatus for performing wireless communication by using a wireless signal, the wireless communication apparatus comprising:
an intensity indication data generation part configured to successively generate intensity indication data each indicating an instantaneous radio wave intensity value of a received wireless signal;
a first data capturing and retaining part configured to cause a plurality of registers to intermittently capture and retain the instantaneous radio wave intensity values indicated by each of the intensity indication data;
a first average calculation part configured to calculate an average of the instantaneous radio wave intensity values retained by the plurality of registers;
a comparison part configured to compare said average with a threshold;
a control part configured to enable a wireless transmission operation when the average is less than or equal to the threshold;
a second data capturing and retaining part configured to, after the calculation by said first average calculation part and upon said comparison part determining that the average exceeds the threshold, cause one of the plurality of registers to capture and retain another instantaneous radio wave intensity value of the received wireless signal; and
a second average calculation part configured to, upon said comparison part determining that the average exceeds the threshold, re-calculate the average using the values retained by the plurality of registers after said capturing and retaining of said one register caused by said second data capturing and retaining part, wherein
the first average calculation part is configured to calculate the average with a frequency corresponding to a frequency of capturing the intensity indication data by the first data capturing and retaining part, and
the comparison part is configured to compare the average with the threshold at a frequency corresponding to a frequency of calculation of the average.

7. The wireless communication apparatus according to claim 6, wherein the first average calculation part calculates the average when a predetermined number of pieces of the intensity indication data have been captured by operation of said first data capturing and retaining part.

8. The wireless communication apparatus according to claim 6, wherein the plurality of registers include a shift register, and capture the intensity indication data in a time-series manner.

9. The wireless communication apparatus according to claim 8, wherein if the number of pieces of the intensity indication data retained has reached a predetermined number, said shift register discards one of the retained pieces of the intensity indication data each time a subsequent piece of the intensity indication data is captured.

10. The wireless communication apparatus according to claim 6, further comprising a strong input determination part for determining whether an intensity indicated by at least one of the pieces of intensity indication data retained by the plurality of registers is greater than a strong input threshold, wherein
if the intensity is determined to be greater than the strong input threshold by said strong input determination part, said control part performs the wireless transmission after a lapse of a certain period since the time of the determination.

11. A wireless communication method for performing wireless communication using a wireless signal, comprising:
an intensity indication data generation step of successively generating intensity indication data each indicating an instantaneous radio wave intensity value of a received wireless signal;
a first data capturing and retaining step of causing a plurality of registers to intermittently capture and retain the instantaneous radio wave intensity values indicated by each of the intensity indication data;
a first average calculation step of calculating an average of the instantaneous radio wave intensity values retained by the plurality of registers;
a comparison step of comparing said average with a threshold;
a control step of enabling a wireless transmission operation when the average is less than or equal to the threshold;
a second data capturing and retaining step of, after said first average calculation step and upon detecting by said comparison step that the average exceeds the threshold, causing one of the plurality of registers to capture and retain another instantaneous radio wave intensity value of the received wireless signal; and
a second average calculation step of, upon detecting by said comparison step that the average exceeds the threshold, re-calculating the average using the values retained by the plurality of registers after said second data capturing and retaining step.

12. A wireless communication apparatus for performing wireless communication using a wireless signal, comprising:
an intensity indication data generation part configured to successively generate intensity indication data each indicating an instantaneous radio wave intensity value of a received wireless signal;
a first data capturing and retaining part configured to cause a plurality of registers to intermittently capture and retain the instantaneous radio wave intensity values indicated by each of the intensity indication data;
a first average calculation part configured to calculate an average of the instantaneous radio wave intensity values retained by the plurality of registers;
a comparison part configured to compare said average with a threshold;
a control part configured to enable a wireless transmission operation when the average is less than or equal to the threshold;
a second data capturing and retaining part configured to, after the calculation by said first average calculation part and upon said comparison part determining that the average exceeds the threshold, cause one of the plurality of registers to capture and retain another instantaneous radio wave intensity value of the received wireless signal; and
a second average calculation part configured to, upon said comparison part determining that the average exceeds the threshold, re-calculate the average using the values retained by the plurality of registers after said capturing and retaining of said one register caused by said second data capturing and retaining part.

13. The wireless communication method of claim 1, wherein only one of the plurality of registers is caused to capture and retain an instantaneous radio wave intensity value of the received wireless signal in the second data capturing and retaining step.

14. The wireless communication apparatus of claim 6, wherein only one of the plurality of registers is caused by the second data capturing and retaining part to capture and retain an instantaneous radio wave intensity value of the received wireless signal.

15. The wireless communication method of claim 11, wherein only one of the plurality of registers is caused to capture and retain an instantaneous radio wave intensity value of the received wireless signal in the second data capturing and retaining step.

16. The wireless communication apparatus of claim 12, wherein only one of the plurality of registers is caused by the second data capturing and retaining part to capture and retain an instantaneous radio wave intensity value of the received wireless signal.

\* \* \* \* \*